United States Patent
Faltesek et al.

(10) Patent No.: US 7,953,228 B2
(45) Date of Patent: May 31, 2011

(54) AUTOMATIC AUDIO SYSTEMS FOR FIRE DETECTION AND DIAGNOSIS, AND CREW AND PERSON LOCATING DURING FIRES

(75) Inventors: Anthony E. Faltesek, Roseville, MN (US); Patrick S. Gonia, Maplewood, MN (US)

(73) Assignee: Honeywell International Inc., Morristown, NJ (US)

( * ) Notice: Subject to any disclaimer, the term of this patent is extended or adjusted under 35 U.S.C. 154(b) by 842 days.

(21) Appl. No.: 10/716,157

(22) Filed: Nov. 18, 2003

(65) Prior Publication Data

US 2005/0105743 A1    May 19, 2005

(51) Int. Cl.
*H04R 29/00* (2006.01)
*H04R 3/00* (2006.01)
*G08B 17/00* (2006.01)
*G08B 17/12* (2006.01)

(52) U.S. Cl. ........ 381/56; 381/58; 340/286.05; 340/577

(58) Field of Classification Search .............. 381/77, 381/80, 81, 82, 57, 58, 56; 340/286.05, 521, 340/522, 566, 577, 588, 332, 628, 506, 517, 340/692

See application file for complete search history.

(56) References Cited

U.S. PATENT DOCUMENTS

| 2,966,209 A | * | 12/1960 | Pegrum ................... 431/16 |
| 4,709,330 A | | 11/1987 | Yokoi et al. |
| 4,851,823 A | | 7/1989 | Mori |
| 5,839,109 A | * | 11/1998 | Iwamida ................ 704/271 |
| 5,931,233 A | * | 8/1999 | La Bonte et al. ............ 169/5 |
| 6,219,643 B1 | | 4/2001 | Cohen et al. |
| 6,295,346 B1 | | 9/2001 | Markowitz et al. |
| 6,898,559 B2 | * | 5/2005 | Saitta ................. 342/357.08 |
| 2003/0097188 A1 | * | 5/2003 | O'Mahoney et al. ...... 340/540 |

FOREIGN PATENT DOCUMENTS

| DE | 3721414 A | * | 1/1989 |
| GB | 2 299 668 A | * | 10/1996 |

OTHER PUBLICATIONS

PCT International Search Report, Aug. 14, 2006, 3 pages.
PCT Written Opinion of the International Searching Authority, Aug. 14, 2006, 4 pages.

* cited by examiner

*Primary Examiner* — Ping Lee
(74) *Attorney, Agent, or Firm* — Husch Blackwell

(57) ABSTRACT

A system and method that use audio feedback from a region being monitored can provide location information pertaining to fire or individuals in the region. Units of a public address system can each be equipped with a microphone. Audio from the microphones can be processed at a common location, such as an alarm control panel. The audio can provide fire profiles as well as information as to individuals in the region being monitored.

14 Claims, 1 Drawing Sheet

AUTOMATIC AUDIO SYSTEMS FOR FIRE DETECTION AND DIAGNOSIS, AND CREW AND PERSON LOCATING DURING FIRES

FIELD OF THE INVENTION

The invention pertains to systems and methods for monitoring regions for alarm conditions such as fires. More particularly, the invention pertains to such systems and methods which incorporate audio transponders or transducers to provide audio indicia of the presence of an alarm or fire condition and which facilitate injecting audio communication signals into the region being monitored.

BACKGROUND OF THE INVENTION

It has been recognized that firefighters need to find the location of a fire or fires in a region of an involved building as quickly as possible after they arrive at a building. Many fire departments assume that if a fire has not been actively fought within 20 minutes of is inception, the building cannot be saved. Significant amounts of time can be spent trying to find the origin of the fire, even when it is evident that there is a fire.

A variety of circumstances can mask the origin as well as the current location of the fire. For example, multiple smoke alarms can be activated which may appear as a possible fire. A sprinkler system flow switch can be activated which many appear as a probable indication of fire. A fire department may arrive at the building and see visible signs such as people evacuating, smoke, or flames.

Unfortunately, these signs may not give a good indication of where the fire is. Active smoke alarms are an indication of the location of smoke. However, the smoke may have traveled some distance from the fire. Sprinkler heads that are flowing are very often close to the actual fire. However, it may not be possible to locate the exact position of active sprinklers due to the conditions in the involved region or building.

One method of finding fires that firefighters use is to listen for the fire. Fires emit characteristic sounds that can be recognized. Locating the characteristic sounds of a fire will usually locate the fire.

Beyond fire location, there is a need to monitor the location of fire fighting personnel in the region. Knowing their location is very important throughout a fire fighting effort. Location information is critical to effecting a rescue if they get in trouble. However, firefighters often cannot easily be located once they enter a building. Many buildings have areas where radio communication with personnel is impossible. Even if they can maintain radio communication, firefighters are often not aware of their location or cannot accurately describe their location.

The location of civilians in an involved building is important and is often not known. In this regard, firefighters often do not know whether they are trapped. Civilians are usually not issued special safety equipment before an emergency to protect them in an emergency.

There continues to be an on-going need for systems and methods usable to monitor, on at least an intermittent basis, the locations of firefighters and victims in fires, explosions, and other emergencies as well as to locate and diagnose fires. Preferably such systems and methods would also be compatible with existing, installed monitoring systems.

DETAILED DESCRIPTION OF THE EMBODIMENTS

Figure 1:
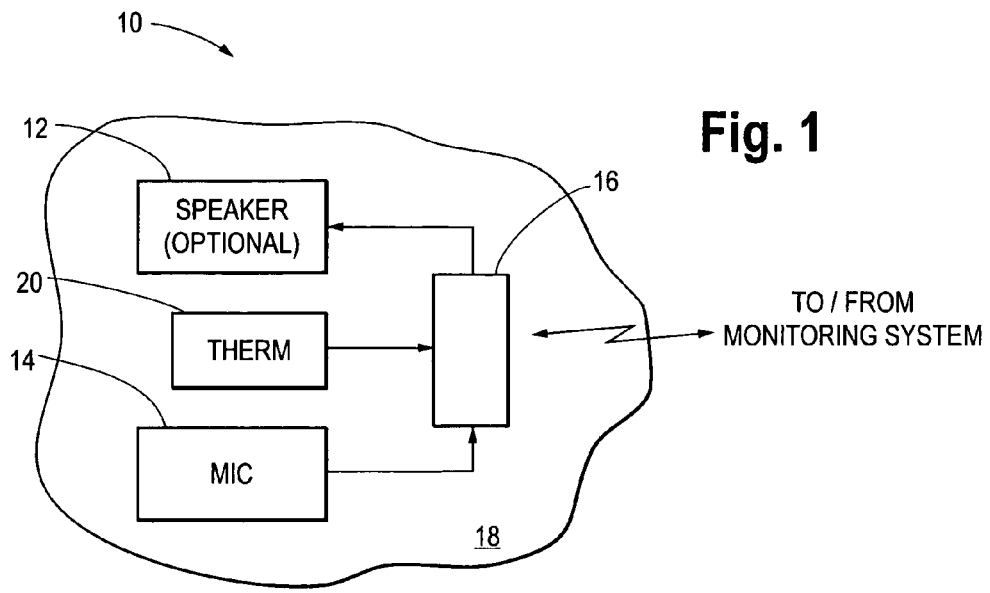
FIG. 1 is a block diagram of a bi-directional audio unit in accordance with the invention.

While embodiments of this invention can take many different forms, specific embodiments thereof are shown in the drawings and will be described herein in detail with the understanding that the present disclosure is to be considered as an exemplification of the principles of the invention and is not intended to limit the invention to the specific embodiment illustrated.

An automatic system that recognized the sound of fire and quickly identified the location of the fire would save fire fighting crews time as they set up to attack the fire. It would also reduce property damage. In one embodiment of the invention, a building audio system can be used to provide firefighters with automatic access to the sounds coming from the various spaces and locations throughout a building. A multi-use building public address system could also be used as an audio detection system.

A multi-use audio system could not only act as a public address system, it could also act as a conductor of audio signals back to a central control panel from individual speaker locations. The system could include microphones in each of the speaker assemblies.

The microphones would preferably be individually addressable or identifiable. Each assembly could have its own sound processing functionality. Another system component could include a common control and processing unit that would control the system, could have a graphical user interface, a handset or other audio monitoring device, and preferably contain an audio pattern recognition module.

Audio signatures of different types of fires could be loaded into the individual assemblies, and also stored at the common processing unit. The speaker/microphone assemblies, as well as the common processing unit could include circuitry to listen continuously for fire sounds.

The system would not activate until a smoke detector, sprinkler flow sensor, or other fire sensor, had gone into alarm, or until the sounds of fire wire heard by an individual microphone or speaker/microphone assembly. In a disclosed embodiment, the common control unit would start to access sounds sent to it from the microphones only when the system was activated.

Once the system was activated, microphones, or, speaker/microphone assemblies would start sending signals back to the common control unit for situation assessment analysis. Signals could be reported on the user display. Firefighters could be provided direct access to sounds picked up on the microphone(s). The system would then gather sounds from all the spaces where there were speaker/microphone assemblies on a periodic basis between emergency messages.

Detected sounds could be compared to the stored signatures and if there is a match, the conclusion could be drawn that the space being listened to has a fire. That information could be displayed on the user interface.

Civilians or firefighters could also use the microphones to identify their location. Other information could include that they are in trouble, information about the fire, or other conditions useful to the fire commander. Their location would be easily determined by identifying the microphone that picked up their message at the loudest level. If fire sound is loud at that location, sound filtering could be activated to suppress, or, to filter out fire sounds when voices were heard.

Fire teams could periodically call out an identifying code, and this information could be picked up by a speech recognition module in the common processing unit to keep the incident commander informed as to their whereabouts. The commander could also use traditional radios, or the audio system, to call back to fire teams or victims and inform them of where they are, and how they need to navigate to get to the fire.

At a point in a fire when it is well established, there may be a great deal of noise, so a speech recognition module might have difficulty understanding what was being said, even with sound filtering to filter out fire noise. A replay mode could then be engaged that allowed a listener to replay the recording of the last few sounds or messages from a certain speaker zone. The zone where the activity is happening could light up on the visual user interface.

Each recording would be time stamped to allow easy differentiation. The replay would mode also allow fire commanders to listen directly to the sounds the fire is making in different spaces, at different times, and achieve a level of diagnosis by identifying individual sounds.

The user interface for the operating fire department personnel could be implemented as a display with a touch screen or an array of buttons or some other method that corresponded to different areas and clusters of speakers. Even with an array of buttons, some touch screen ability would be useful so that any individual microphone assembly could be isolated.

In another embodiment, microphones could be installed at a plurality of locations in a region being monitored irrespective of the location of speakers or audio output devices. The microphones in this environment provide a plurality of spaced apart sources of building, or region audio which can then be analyzed as discussed above.

In another aspect, a system that embodies the invention could have an automatic user interface that would display the location of fire teams, or unidentified persons, in the location that their sound was last detected. An audio tracking algorithm could also be used to track each source of sound and show their progress as they move through the building. Firefighters wear unique sound generators that can be tracked. This information would help fire commanders keep current as to where their fire teams are, and where they have come from in the facility. It would also identify possible civilians, their location, and whether they are still moving. This information could greatly speed a rescue.

The microphones, or microphone assemblies can be expected to fail at some point as the space they are in burns. A temperature sensor could optionally be placed in the assembly. This sensor could provide readings, once the system has been activated, or could act as a continuous monitor of building temperatures. Once the system has been activated by a smoke or other detector, the system could start reporting temperatures and track where temperatures are rising.

The extent of heated air and associated temperatures could be recorded and displayed for fire commanders. This temperature profile could provide additional information as to fire development.

The heat sensors could also act as thermal monitors. If a heat sensor(s) failed after the system had been activated, the system could assume that that assembly had failed due to being overheated. The system would also be able to call that conclusion into doubt if relatively low temperature readings had been recorded just prior to failure. If there was doubt about a failure conclusion, the assembly could be tested by generating a burst of sound from a speaker to see if feedback resulted. If feedback resulted, a conclusion could be drawn that the assembly is intact, and the loss of the temperature signal was due to a non-thermal cause.

Embodiments of the present system and method have numerous advantages which include, without limitation:

Identifying a fire by sensing fire sounds through microphones

Determining the exact location of fires, crews, and victims by sensing which microphone heard the sounds Enabling the tracking of fire crews by having them call out codes that would be sensed through the microphones, and threading the sequential locations together track the crew's movements Facilitating the identification of and determining the location of people in the region by sensing their voices through the microphones Enabling the diagnosis of aspects of the fire by providing fire commanders with an ability to listen directly to the fire Monitoring temperatures at the locations of respective audio assemblies Determining the probable cause of audio assembly failure and health by inference from tracked temperature FIG. 1 is block diagram representation of an audio unit 10 in accordance with the invention. The unit 10 includes a speaker 12, which might be optional as discussed below, and a microphone 14. Optional interface circuitry 16 can be incorporated into the unit 10 for interfacing purposes, gain and the like. Each of the units 10 is carried in a housing 18. Audio unit 10 can also include an optional thermal sensor 20, discussed subsequently.

The units 10 can be coupled so as to be in communication with a regional monitoring system either with hardwired interconnections or wirelessly as would be understood by those of skill in the art. It would also be understood by those of skill in the art that the speaker 12 and microphone 14 could be configured as a singular structure without departing from the spirit and scope of the present invention. Further, the form of communication with the monitoring system is also not a limitation of the present invention.

It will also be understood that speaker 12 could, in an alternate embodiment, be optional in or deleted entirely from the units 10. In such configurations, the respective microphone 14 could be used alone or in combination with thermal sensor 20. This configuration could feed fire sounds as well as temperature information to a displaced site for processing.

Figure 2:
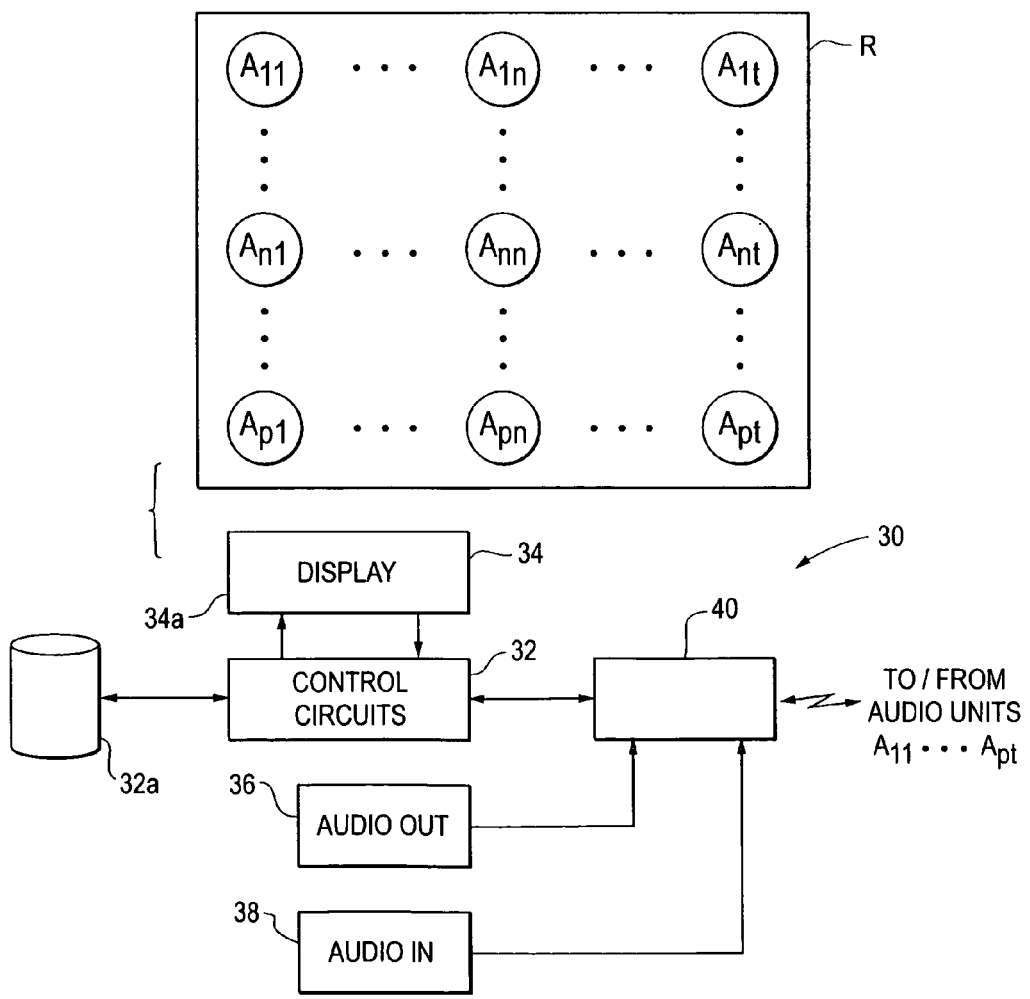
FIG. 2 is a block diagram of a monitoring system which incorporates a plurality of the bi-directional audio units of FIG. 1.

FIG. 2 illustrates a region R which is to be monitored. The region R has been equipped with a plurality of audio units, corresponding to the audio unit 10, namely A11 . . . A1*t* . . . Apt. While the exact configuration of the audio units 10 in the region R is not a limitation of the present invention, those of skill will understand that it is preferred to provide an adequate number of audio units in the region 10 so as to insure that the entire region R is accessible to outputs from one or more speakers, corresponding to the speaker 12, or, capable of receiving inputs at one or more sites by respective microphones, such as the microphone 14.

A monitoring system 30, which could be part of an alarm control panel, is in communication with the audio units A11 . . . Apt either via hardwired transmission lines or wirelessly. The system 30 incorporates control circuitry 32, that might include a programmed processor capable of executing pre-stored software which, for example, could be stored in a disk drive 32*a* or other computer readable media, all without limitation. Circuitry 32 is in turn coupled to display 34, a user interface, which could also include touch screen inputs indicated at 34*a*.

Bidirectional communication could, but need not, be provided between circuits 32 and display/touch screen inputs 34, 34a. Uni-directional communications might be sufficient and come within the spirit and scope of the invention, in systems which incorporate only a plurality of input transducers. System 30 also incorporates an audio output device 36, a speaker, and an audio input device, such as a microphone 38.

Those of skill will understand that the input audio and the output audio can be selectively switched, for example via exemplary circuits 40 which could operate under the control of control circuits 32. Hence, in an exemplary embodiment, as in FIG. 2, control circuits 32 can selectively provide at speaker 36 audio outputs from one or another of the audio units Aii. In similar fashion, via switches 40, control circuits 32 can transmit input audio to a selected one or more of the audio units Aii as, for example, would be the case in a public address system.

Thus, system 30 can selectively obtain audio inputs from any of the audio units Aii as well as easily and quickly switch therebetween. In the same fashion, system 30 can couple input audio to one or more of the audio units Aii as selected.

System 30 can obtain audio feedback from the region R which would enable firefighting personnel to locate and to diagnose fires, locate and rescue individuals in the region R. System 30 would also enable fire commanders to stay in continuous bidirectional audio contact with firefighters in the region R via the audio units such as Aii and to keep track of their locations which could be presented on display 34. Audio signal profiles as a function of location and/or time can be created and stored in disk drive 32a for recall and analysis.

Pre-stored software such as could be retrieved from disk drive 32a and executed by processor 32 could incorporate fire profile recognition software so as to audibly be able to recognize the presence of a developing fire condition. Pre-stored speech recognition software could also be executed by circuits 32 to recognize incoming audio from individuals in the region R. Alternately, pre-stored filter software could be executed by circuits 32 so as to improve the quality of received audio from individuals in the region R by filtering out fire-related noises.

A plurality of images of the region R illustrative of an on-going fire condition could be stored by circuits 32 on disk drive 32a. Subsequently, a time-based sequence of these images could be represented on the display 34 for purposes of better understanding an on-going, developing, fire condition and/or locations where individuals in need of rescue might be found. The pre-stored software could also implement an audio tracking algorithm such that the progress of fire fighting personnel through the region R could be automatically presented or mapped on display 34.

When implemented, the optional temperature, or thermal, sensors 20, scattered throughout the region R in the respective audio units Aii could continuously monitor temperature in the region at a variety of locations. Temperature profiles as a function of location, and/or time can be created and stored in drive 32a. The temperature profiles could also be retrieved from disk drive 32a and presented by display 34 to firefighting personnel. Further, a failure of the respective thermal sensor in the presence of an on-going fire condition could be used as an indication of the extent and seriousness of the fire at the respective audio unit.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A system comprising:
a plurality of audio modules;
at least one audio output transducer and at least one audio input transducer that directly detects human audible sound directly associated with each of the plurality of audio modules;
a common control unit in communication with the plurality of audio modules;
a plurality of stored fire signatures associated with the common control unit where each stored fire signature identifies a different type of fire;
an output device coupled to the control unit, the control unit presents at least audio information received at various of the modules, via the output device, with the presented audio indicative of the presence of individuals and selected environmental conditions in the vicinity of the respective module; and
at least one of circuitry or software to associated with the common control unit that automatically compares human audible sound directly detected by the audio input transducers and received at the control unit with the plurality of fire signatures, to establish that a fire is present in the vicinity of at least one of the modules by matching the human audible sound with at least one of the plurality of fire detection signatures.

2. A system as in claim 1 which includes an audio input device, at the control unit for transmitting audio messages to be output by transducers in at least some of the audio modules.

3. A system as in claim 1 which includes at least one of circuitry or software to identify the at least one audio input transducer.

4. A system as in claim 1 which includes at least one of circuitry or software to filter fire related noise if combined with voice.

5. A system as in claim 1 which includes speech recognition software for processing received audio.

6. A system as in claim 1 where at least some of the plurality of modules include thermal sensors.

7. A system as in claim 6 including software for processing thermal related signals received from at least some of the thermal sensors of the plurality of modules.

8. A method of monitoring a region comprising:
directly sensing human audible sounds via respective microphones from spaced apart locations in the region;
automatically analyzing the sensed human audible sounds by comparing the sensed human audible sounds with a plurality of stored signatures of a fire where each stored signature identifies a different type of fire;
matching the sensed human audible sounds from at least one of the respective microphones with one of the plurality of stored signatures; and
responsive to recognizing an audio fire signature of characteristic sounds emitted by a fire by matching the sensed human audible sound from the at least one microphone with the one of the plurality of stored signatures, displaying a location of origination thereof.

9. A method as in claim 8 which includes recognizing sounds of individuals at one or more locations in the regions.

10. A method as in claim 8 which includes suppressing fire sounds from at least some of the sensed audio signals in order to more effectively recognize other sources of sound.

11. A system comprising:
a plurality of audio input transducers that each directly detects human audible sound;
at least one audio output transducer;
a control unit in communication with the output transducer and the plurality of input transducers the control unit contains a plurality of audio signatures of fires where each of the plurality of audio signatures identifies a different type of fire, the control unit compares the directly detected human audible sound with the audio signatures to detect a fire;
a user interface device coupled to the control unit; and
the control unit presents at least location related audio information, received at various input transducers, via the interface device with the presented audio indicative of the presence of individuals or certain environmental conditions including at least the detected fire in the vicinity of the respective module.

12. A system as in claim 11 where the control unit uniquely identifies each of the audio input transducers.

13. A system as in claim 11 where the control unit suppresses fire sounds in order to more effectively detect human voice.

14. A system as in claim 11 which includes speech recognition software for processing received audio.

* * * * *